(12) United States Patent
Gallagher et al.

(10) Patent No.: US 6,934,633 B1
(45) Date of Patent: Aug. 23, 2005

(54) HELMET-MOUNTED PARACHUTIST NAVIGATION SYSTEM

(75) Inventors: Dennis Gallagher, Southport, FL (US); Kirk Vanzandt, Panama City, FL (US); William W. Hughes III, Panama City, FL (US); Charles Holmes, Southport, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/965,014

(22) Filed: Oct. 15, 2004

(51) Int. Cl.[7] ............................................. G01C 21/26
(52) U.S. Cl. ............................. 701/213; 701/3; 345/8
(58) Field of Search ........................... 701/3, 4, 5, 10, 701/16, 18, 213, 224, 225; 345/6, 7, 8; 340/977–980; 359/630

(56) References Cited

U.S. PATENT DOCUMENTS

| | | | |
|---|---|---|---|
| 6,421,031 B1 * | 7/2002 | Ronzani et al. | 345/8 |
| 6,675,800 B2 * | 1/2004 | Keller | 128/205.23 |
| 6,700,497 B2 * | 3/2004 | Hibbs et al. | 340/584 |
| 6,714,141 B2 * | 3/2004 | Kennedy | 340/980 |
| 6,757,068 B2 * | 6/2004 | Foxlin | 356/620 |

* cited by examiner

Primary Examiner—Richard M. Camby
(74) Attorney, Agent, or Firm—James T. Shepherd

(57) ABSTRACT

A parachutist navigation system includes a display attached to a side vision area of a parachutist's goggles, a navigation pod attached to the parachutist's helmet, and a remotely located controller. The navigation pod supports therein a GPS receiver and a processor provided with mission data supplied by the controller. The processor uses the mission data and GPS signals to generate a plurality of display-formatted data sets. Coupled to the processor is an user-controlled input device used to select at least one of the plurality of display-formatted data sets for output to the display.

19 Claims, 1 Drawing Sheet

HELMET-MOUNTED PARACHUTIST NAVIGATION SYSTEM

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to portable navigation systems, and more particularly to a helmet-mounted parachutist navigation system.

BACKGROUND OF THE INVENTION

Military parachutists frequently carry a navigation computer/system that provides the parachutist with information (e.g., altitude, wind speed, ground speed, etc.) which can then be used by the parachutist as he controls his parachute. These navigation systems are either hand-held or chest-mounted. The obvious drawback of the hand-held systems is that they must be held while simultaneously attempting to control the parachute. The chest-mounted systems include a display that the parachutist must look downward to view. However, inclement weather can make such viewing difficult or impossible. Furthermore, the chest region of a parachutist is generally considered to be a valuable location for the mounting of other mission-essential equipment.

SUMMARY OF THE INVENTION

Accordingly, it is an object of the present invention to provide a parachutist navigation system that requires minimal use of the parachutist's hands.

Another object of the present invention is to provide a parachutist navigation system having an easily viewable display that is unaffected by adverse weather conditions.

Still another object of the present invention is to provide a parachutist navigation system maintained at a location on the parachutist that does not interfere with parachute control operations or mission operations.

Other objects and advantages of the present invention will become more obvious hereinafter in the specification and drawings.

In accordance with the present invention, a parachutist navigation system utilizes a display adapted to be attached to a side vision area of a parachutist's goggles such that upward and downward fields of view through the goggles are unobstructed. A housing, adapted to be attached to a parachutist's helmet, supports therein a plurality of components to include a Global Positioning System (GPS) receiver for receiving GPS signals and a processor coupled to the GPS receiver. The processor is provided with mission data to include a landing zone, wind speed as a function of altitude and a preferred altitude at the landing zone. The processor uses the mission data and GPS signals to generate a plurality of display-formatted data sets to include a display-formatted data set of the mission data, a display-formatted data set of location data indicated by the GPS signals, and a display-formatted data set of computed data generated by the processor using the mission data and location data. Coupled to the processor is a user-controlled input device used to select at least one of the plurality of display-formatted data sets for output to the display. Located remotely with respect to the housing is a means for up loading the mission data to the processor.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
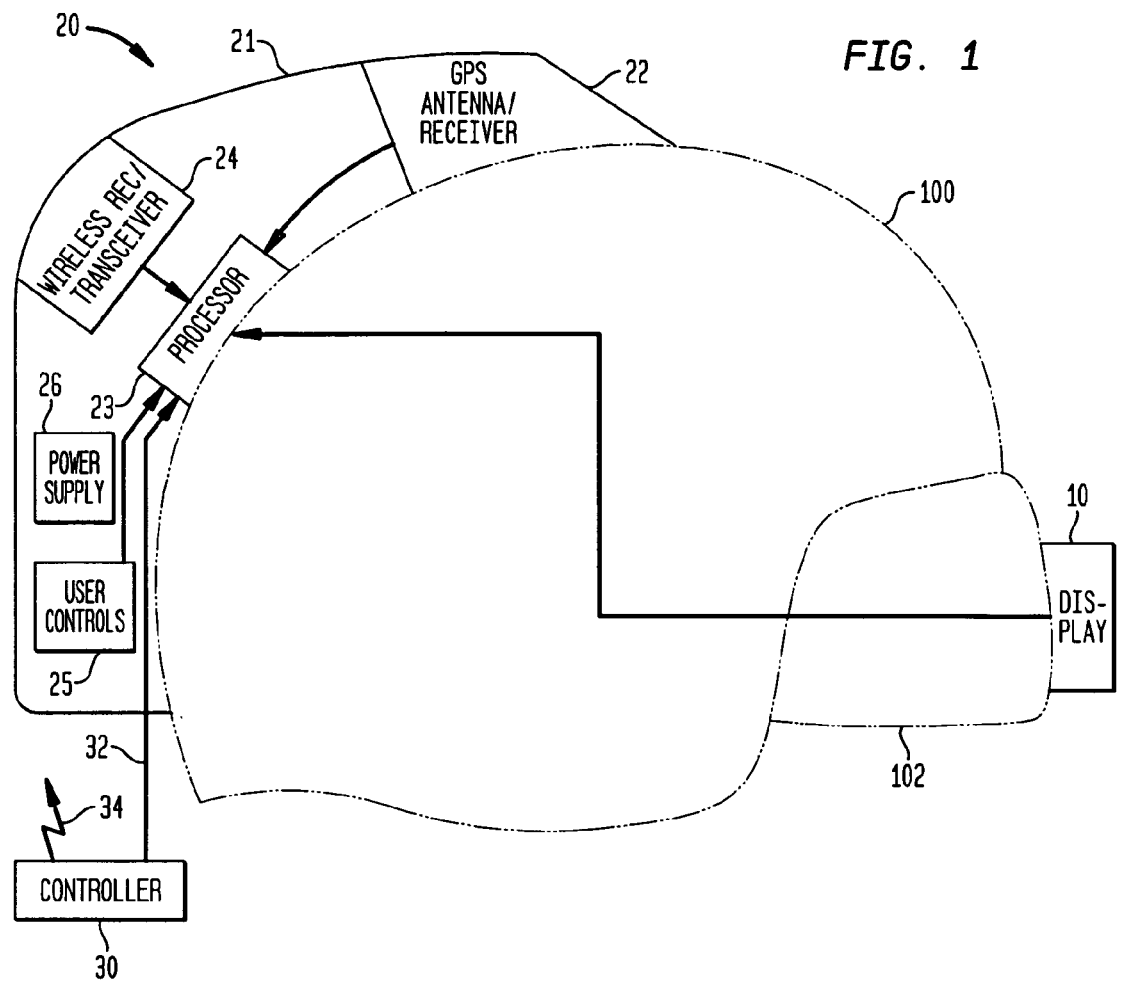
FIG. 1 is a side schematic view of a helmet-based parachutist navigation system according to an embodiment of the present invention.

Referring now to the drawings, and more particularly to FIG. 1, an embodiment of a helmet-based parachutist navigation system is shown. The navigation system includes elements that are attached to a parachutist's helmet 100 and goggles 102, both of which are shown in phantom. The helmet and goggle designs are not limitations of the present invention.

Figure 2:
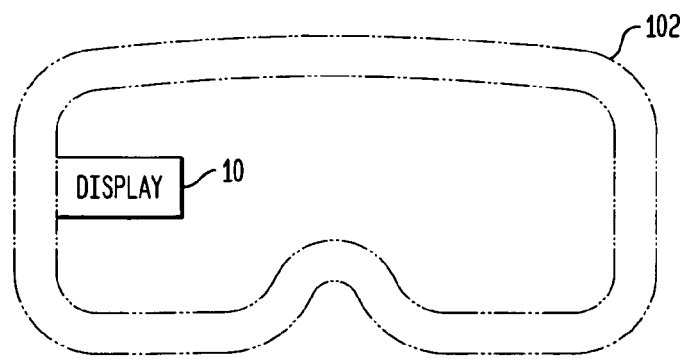
FIG. 2 is a head-on view of the parachutist's helmet illustrating the position of the navigation system's display.

The navigation system of the present invention includes the following three essential elements: a goggle-mounted display 10, a helmet-mounted navigation pod 20, and a controller 30 that is either temporarily hardwired to navigation pod 20 or able to be coupled thereto in a wireless fashion as will be explained further below. As is best seen in FIG. 2, goggle-mounted display 10 (which can be a monochrome or color display device) is mounted to a side or peripheral vision area (i.e., left or right side) of goggles 102. It is preferred that display 10 be located approximately midway between the top and bottom of the viewing area of goggles 102 so as not to obstruct the parachutist's upward or downward views. In this way, display 10 will not interfere with the parachutist's ability to see his parachute, shroud lines, release buckles, chest worn equipment, or the ground during landing. The particular type of display 10 and features thereof are not limitations of the present invention. Thus, display 10 can utilize any standard night/day display technology such as a liquid crystal display (LCD), an organic light emitting diode display (OLED), or a field emission display (FED), just to name a few. Further, display 10 could be mounted to goggles 102 in such a way that display 10 could be rotated slightly up/down and/or left/right to accommodate a particular user's needs. Still further, magnifying optics (not shown) could be included or added to display 10 as needed.

Display 10 receives display data from navigation pod 20. The display data can include one or more of the following types of data: (i) location of the parachutist wearing helmet 100, (ii) mission-specific data such as the location of landing zone, environmental conditions, navigation waypoints, parachute characteristics, and preferred altitudes at waypoints and/or the landing zone, and (iii) locations of other parachutists on the same mission. The display data can be assembled in a variety of display views that are not limitations of the present invention.

Navigation pod 20 includes a housing 21 attached to helmet 100. It is preferred that housing 21 be mounted to the rear portion of helmet 100 and have a streamlined exterior to minimize drag and prevent entanglement with parachute lines. Supported in housing 21 are a number of components used to collect, assemble and/or generate the various types of display data being supplied to display 10. A Global Positioning System (GPS) antenna/receiver 22 is mounted in the upper portion of housing 21 to receive GPS signals in ways that are well understood in the art. The GPS signals are provided to an onboard processor 23 that is programmed to process the GPS signals to develop a location of the person wearing helmet 100.

Processor 23 is further provided with the current mission-specific data by controller 30. Such mission-specific data can be provided via a hardwire link 32 that is temporarily coupled to processor 23 prior to the parachutist's mission. More preferably, navigation pod 20 includes a wireless receiver/transceiver 24 that can receive wireless transmissions 34 from controller 30. In this way, a single controller 30 could be used to simultaneously provide mission-specific data to a plurality of navigation pods 20 (i.e., a plurality of parachutists) about to embark on the same mission. Furthermore, mission-specific data could be updated after the parachutist(s) jump to accommodate last minute changes or changing environmental conditions. Still further, if a wireless transceiver 24 is used, the location of the parachutist wearing helmet 100 can be broadcast for monitoring at controller 30 or by other parachutists on the same mission.

Also coupled to processor 23 is one or more user controls 25 (e.g., buttons, dials, slides, etc., mounted on the side of housing 21) that can be used to select one of the various type of displays. For example, a display view could illustrate just mission-specific data or just (GPS) location data. Another option is to combine different types of data such as a GPS location of the parachutist, the desired landing zone, the parachutist's altitude and current wind speeds at that altitude. Still another option is for processor 23 to be programmed with navigation software that computes information for the parachutist using the collected GPS data and the provided mission-specific data. For example, the GPS and mission-specific data could be used to calculate whether or not the parachutist was "on track" to achieve the desired landing zone. This computation could be provided in a simple "YES/NO" display format or in a display format that indicated how far "off track" the parachutist is. Navigation algorithms that perform such computations are well known in the art.

Power for each of the above-described components of navigation pod 20 is typically provided by an onboard power supply 26 which can be rechargeable. Accordingly, power supply 26 could be individually removable from pod 20, or the entirety of pod 20 could be removable from helmet 100 to allow power supply 26 to be recharged or replaced.

Controller 30 can be as simple or complex as need be to provide the above-described mission-specific data to navigation pod 20. For example, controller 30 could be a hand-held personal data assistant (PDA), laptop or other type of more complex computer. Controller 30 is equipped with one or both of hardwired and wireless data transfer capabilities to support hardwire link 32 and wireless link 34.

The advantages of the present invention are numerous. Parachutist navigation data is easily viewed in all weather conditions without obstructing one's view of other essential parachute equipment. The system requires minimal use of the parachutist's hands. Since the display is indexed to the parachutist's helmet/goggles, the display will always appear stable to the user regardless of head movement.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A parachutist navigation system, comprising:
   a display adapted to be attached to a side vision area of a parachutist's goggles wherein upward and downward fields of view through the goggles are unobstructed;
   a housing, adapted to be attached to a parachutist's helmet, for supporting therein a plurality of components to include
   a Global Positioning System (GPS) receiver for receiving GPS signals;
   a processor coupled to said GPS receiver and to said display, said processor being programmed with mission data and using said mission data and said GPS signals to generate a plurality of display-formatted data sets to include a display-formatted data set of said mission data, a display-formatted data set of location data indicated by said GPS signals, and a display-formatted data set of computed data generated by said processor using said mission data and said location data; and
   means, coupled to said processor, for selecting at least one of said plurality of display-formatted data sets for output to said display; and
   means, located remotely with respect to said housing, for supplying said mission data to said processor.

2. A parachutist navigation system as in claim 1 further comprising a wireless receiver mounted in said housing for receiving said mission data in a wireless fashion from said means for supplying.

3. A parachutist navigation system as in claim 1, wherein said mission data includes a landing zone location, wind speed as a function of altitude and a preferred altitude at said landing zone.

4. A parachutist navigation system as in claim 1 further comprising a wireless transceiver mounted in said housing for receiving said mission data in a wireless fashion from said means for supplying and for transmitting said location data therefrom in a wireless fashion.

5. A parachutist navigation system as in claim 1 wherein said display is a monochrome display.

6. A parachutist navigation system as in claim 1 wherein said display is a color display.

7. A parachutist navigation system as in claim 1 further comprising a power supply mounted in said housing for supplying power to each of said plurality of components.

8. A parachutist navigation system as in claim 1 wherein said means for selecting comprises at least one user-operated control mounted on said housing.

9. A parachutist navigation system, comprising:
   a display adapted to be attached to a side vision area of a parachutist's goggles wherein upward and downward fields of view through the goggles are unobstructed;
   a streamlined housing, adapted to be attached to a back portion of a parachutist's helmet, for supporting therein a plurality of components to include
   a Global Positioning System (GPS) receiver for receiving GPS signals;
   a wireless transceiver for receiving mission data to include a landing zone, wind speed as a function of altitude and a preferred altitude at said landing zone;
   a processor coupled to said GPS receiver and to said display, said processor using said mission data and said GPS signals to generate a plurality of display-formatted data sets to include a display-formatted data set of said mission data, a display-formatted data set of location data indicated by said GPS signals, and a display-formatted data set of computed data generated by said processor using said mission data and said location data; and means, coupled to said processor, for selecting at least one of said plurality of display-formatted data sets for output to said display; and means, located remotely with respect to said housing, for wirelessly transmitting said mission data to said wireless transceiver.

10. A parachutist navigation system as in claim 9 wherein said wireless transceiver transmits said location data therefrom in a wireless fashion.

11. A parachutist navigation system as in claim 9 wherein said display is a monochrome display.

12. A parachutist navigation system as in claim 9 wherein said display is a color display.

13. A parachutist navigation system as in claim 9 further comprising a power supply mounted in said housing for supplying power to each of said plurality of components.

14. A parachutist navigation system as in claim 9 wherein said means for selecting comprises at least one user-operated control mounted on said housing.

15. A parachutist navigation system, comprising:
a display adapted to be attached to a side vision area of a parachutist's goggles wherein upward and downward fields of view through the goggles are unobstructed;
a streamlined housing, adapted to be attached to a back portion of a parachutist's helmet, for supporting therein a plurality of components to include a Global Positioning System (GPS) receiver for receiving GPS signals;
a wireless transceiver for receiving mission data to include a landing zone, wind speed as a function of altitude and a preferred altitude at said landing zone;
a processor coupled to said GPS receiver and to said display, said processor using said mission data and said GPS signals to generate a plurality of display-formatted data sets to include a display-formatted data set of said mission data, a display-formatted data set of location data indicated by said GPS signals, and a display-formatted data set of computed data generated by said processor using said mission data and said location data; and
at least one parachutist-operated control coupled to said processor for selecting at least one of said plurality of display-formatted data sets for output to said display; and
a portable computer, located remotely with respect to said housing, for wirelessly transmitting said mission data to said wireless transceiver.

16. A parachutist navigation system as in claim 15 wherein said wireless transceiver transmits said location data therefrom in a wireless fashion.

17. A parachutist navigation system as in claim 15 wherein said display is a monochrome display.

18. A parachutist navigation system as in claim 15 wherein said display is a color display.

19. A parachutist navigation system as in claim 15 further comprising a power supply mounted in said housing for supplying power to each of said plurality of components.

* * * * *